United States Patent
Sudermann et al.

(10) Patent No.: US 10,315,143 B2
(45) Date of Patent: *Jun. 11, 2019

(54) METHOD FOR PRODUCING A FILTER ELEMENT PROVIDED WITH A SEALING PART

(71) Applicant: MANN+HUMMEL GMBH, Ludwigsburg (DE)

(72) Inventors: Arthur Sudermann, Steinheim (DE); Fabian Wagner, Moeglingen (DE); Thomas Sieber, Marklkofen (DE); Guenter Goerg, Moeglingen (DE); Michael Metzger, Waiblingen (DE); Markus Roehrig, Landshut (DE); Thomas Jessberger, Asperg (DE); Timo Dirnberger, Marbach (DE); Bernd Joos, Lorch (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/493,625

(22) Filed: Apr. 21, 2017

(65) Prior Publication Data

US 2017/0282106 A1   Oct. 5, 2017

Related U.S. Application Data

(63) Continuation of application No. 14/492,658, filed on Sep. 22, 2014, now Pat. No. 9,630,131, which is a
(Continued)

(30) Foreign Application Priority Data

Mar. 21, 2012   (DE) .................... 10 2012 005 530

(51) Int. Cl.
*B01D 46/00* (2006.01)
*B01D 46/42* (2006.01)
(Continued)

(52) U.S. Cl.
CPC ..... *B01D 46/0001* (2013.01); *B01D 46/0005* (2013.01); *B01D 46/42* (2013.01);
(Continued)

(58) Field of Classification Search
CPC ................ B01D 46/00; B01D 46/0001; B01D 46/0005; B01D 46/42; B01D 2271/025;
(Continued)

(56) References Cited

U.S. PATENT DOCUMENTS 8,048,187 B2   11/2011   Merritt
8,409,312 B2 *   4/2013   Gorg .................. B01D 46/0063
                                                                55/385.3
(Continued)

*Primary Examiner* — Amber R Orlando
*Assistant Examiner* — Minh Chau T Pham
(74) *Attorney, Agent, or Firm* — James Hasselbeck

(57) ABSTRACT

A method for producing a filter element provided with a sealing part in which the sealing material is introduced into a casting chamber between two tundish parts when in the non-cured state, and a compensation space connected to the casting chamber for the expansion of the sealing material.

11 Claims, 3 Drawing Sheets

Related U.S. Application Data continuation of application No. PCT/EP2013/055917, filed on Mar. 21, 2013.

(51) Int. Cl.
| | |
|---|---|
| *B29C 39/10* | (2006.01) |
| *B29C 44/12* | (2006.01) |
| *F02M 35/024* | (2006.01) |
| *B29K 75/00* | (2006.01) |
| *B29K 105/04* | (2006.01) |
| *B29L 31/14* | (2006.01) |

(52) U.S. Cl.
CPC .............. *B29C 39/10* (2013.01); *B29C 44/12* (2013.01); *F02M 35/02408* (2013.01); *B01D 2271/025* (2013.01); *B01D 2271/027* (2013.01); *B29K 2075/00* (2013.01); *B29K 2105/04* (2013.01); *B29L 2031/14* (2013.01)

(58) Field of Classification Search
CPC ..... B29C 39/10; B29C 44/12; B29K 2075/00; B29K 2105/04; B29L 2031/14
USPC ...... 55/385.3, 490, 493, 495, 497, 502, 503, 55/498; 123/198 E
See application file for complete search history.

(56) References Cited

U.S. PATENT DOCUMENTS

| | | |
|---|---|---|
| 9,630,131 B2* | 4/2017 | Sudermann ........ B01D 46/0001 |
| 2009/0064646 A1 | 3/2009 | Reichter |

\* cited by examiner

METHOD FOR PRODUCING A FILTER ELEMENT PROVIDED WITH A SEALING PART

CROSS-REFERENCE TO RELATED APPLICATIONS

This application is a continuation of U.S. patent application Ser. No. 14/492,658 filed Sep. 22, 2014, now U.S. Pat. No. 9,630,131 B2, which is a bypass continuation application of international application No. PCT/EP2013/055917 having an international filing date of Mar. 21, 2014 and designating the United States, the international application claiming a priority date of Mar. 21, 2013, based on prior filed German patent application No. 10 2012 005 530.7, the entire contents of the aforesaid US application, the international application and the aforesaid German patent application being incorporated herein by reference.

TECHNICAL FIELD

The invention relates to a method for producing a filter element provided with a sealing part.

BACKGROUND

In WO 2009/150165 A1, a filter unit for filtering gaseous fluids is described comprising a filter insert part with a filter medium and a sealing element, said element being clamped between sealing struts on parts of the filter housing. The filter element assumes the shape of a rectangle and is comprised of a folded filter paper which is circumferentially enclosed at the edge portion by the sealing element. In the assembled state, a sealing section of the sealing element projects into a receiving space which is formed on one of the housing parts. A second housing part covers the sealing element and acts on the sealing section transversely to the mounting direction of the filter insert part.

The sealing element extending circumferentially around the filter element is typically molded or foamed, for which tundishes are provided into which the sealing material is introduced in the non-cured state, whereupon the sealing element is inserted. After curing, the sealing material is fixedly connected to the edge portion of the filter element. In the tundish, in which the non-cured sealing material is introduced, vent openings are incorporated through which the sealing material can escape. After curing, drip-shaped elevations of sealing material are situated on the outer side of the sealing element in the region of the vent openings which must be cut off to obtain a smooth sealing surface on the sealing element.

SUMMARY OF THE INVENTION

The invention is based on the object of using simple measures to produce a filter insert, comprising a filter element and a sealing part.

The inventive method relates to the production of a filter insert for a filter unit, which is preferably used for gas filtration, for example for the filtration of the intake air for an internal combustion engine. In principle, however, a use of the filter insert in a filter unit for filtration of liquid comes into consideration within the scope of the invention as well, for example as a fuel or oil filter.

The filter insert comprises a filter element and a sealing part that advantageously extends circumferentially about the filter element. The filter insert part is inserted into a filter housing of the filter unit, wherein the sealing part separates the raw side from the clean side of the filter element and is pressed sealingly against a wall of the filter housing in the assembled state. It is for example possible that a sealing portion of the sealing part is received in a receiving space of the housing and is acted upon by the force of a further housing part, e.g. a cover. The contact direction is in this case either parallel to the flow-through direction of the filter element, i.e. axial, or transversely to the flow-through direction, i.e. radial.

The filter element is, for example, a rectangular filter element which is circumferentially surrounded by the sealing part. The filter element may consist of a filter paper that is folded in a zigzag shape.

For the production of the sealing part at the filter element of the filter insert part, at least two tundish parts are used which are configured such that a casting chamber is formed between the tundish parts which serves to receive the sealing material in the non-cured state. In particular, the at least two tundish parts are assembled to form the chamber. The casting chamber is filled with the sealing material and can be subsequently cured, thereby obtaining the sealing part. The casting chamber is, for example, formed such that a first chamber wall of the casting chamber is formed by the first tundish part and a second chamber wall of the casting chamber is formed by the second tundish part, wherein the sealing part in the cured, hardened state exhibits sealing surfaces that correspond at least to a respective portion of the chamber walls of different tundish parts. Thus, at least one sealing surface is generated at the sealing part with each tundish part.

Furthermore, it is provided that in the casting chamber, a compensation space is provided for the expansion of the sealing material during the curing process. Additionally or alternatively to the compensation space within the casting chamber, an embodiment may also be considered in which the compensation space is disposed outside the casting chamber and connected to the casting chamber so that it in this embodiment as well, sealing material may enter the compensation space during the curing process. The end face of the sealing part expanding into the compensation space does not necessarily form a sealing surface, so that the exact geometry of this end face of the sealing part does not play a decisive role for the sealing between raw side and clean side. In this way, an additional degree of freedom can be obtained in the production process due to the fact that the amount of sealing material used in the non-cured state needs only to be within a defined range. If this range is complied with, there is a sufficiently large compensation volume in the compensation space into which excess sealing material is allowed to expand without affecting the other geometry of the sealing part and in particular the sealing surfaces. Additional vent openings that are provided in the prior art can be omitted, so that after the curing of the sealing material, the sealing surfaces are formed with smooth walls and without projecting sealing tabs and no or only reduced rework is required.

In principle, it is possible that the end face of the sealing part projecting into the compensation space abuts a sealing surface and forms an angle with the sealing surface, where embodiments may also be possible in which the end face is situated at a distance from the sealing surfaces of the sealing part. Where the end face has no sealing function, the degree to which the end face projects into the compensation space plays only a minor role, thereby allowing the dosage of the sealing material within larger limits.

As sealing material, for example, a PUR foam (polyurethane) may come into consideration. In principle, all sealing materials can be used that are liquid or foam-like in the non-cured state and can be introduced into the casting chamber between the two tundish parts.

The filter element, at the edge portion of which the sealing part is attached, can already be inserted during the production of the sealing part in the tundish parts, so that even in the non-cured state of the sealing material, there is a contact with the edge portion of the filter element. After curing, the sealing part is fixedly connected to the filter element.

The compensation space may be formed within one tundish part or in the assembled state as a closed space by both tundish parts, which is part of the casting chamber or in communication with the casting chamber. During the production process, the amount of non-cured sealing material introduced into the casting chamber is dimensioned such that in the cured state, the end face projecting into the compensation space is situated at a distance from the bottom or the top of the compensation space. The distance constitutes a safety margin, so that fluctuations in the filling amount of the sealing material or in the expansion behavior of the thermosetting sealing material can be compensated. In particular, a subsequent cutting of the sealing part can be omitted.

According to a further embodiment, the compensation space is formed as a space open to the exterior, but in communication with the casting chamber, so that sealing material can flow from the casting chamber into the compensation space and can expand there. In this embodiment, it is also sufficient to introduce a merely approximate specific amount of sealing material, since fluctuations can be accommodated by means of the open compensation space. The open compensation space is either arranged within just one tundish part or is, according to an advantageous embodiment, bounded by both tundish parts, which facilitates the demolding after the casting process.

Furthermore, it may be expedient to provide the sealing part on at least one side with a chamfer which is introduced either after curing, for example by cutting the sealing part to size, or even during the casting process through appropriate configurations of the tundish parts. The chamfer or chamfers facilitate the mounting of the filter insert part in the filter housing.

BRIEF DESCRIPTION OF THE DRAWINGS

Further advantages and advantageous embodiments are described in the further claims, the description of the figures and the drawings. The following is shown:

In the figures, identical are provided with the same reference numerals.

DETAILED DESCRIPTION

Figure 1:
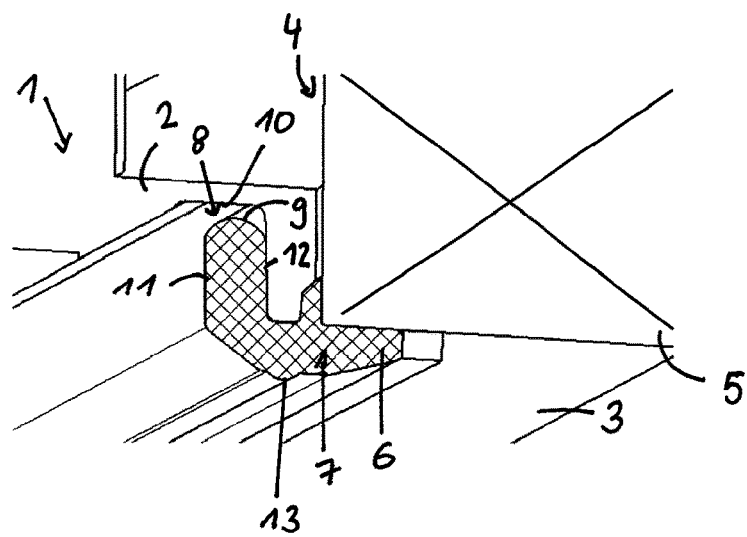
FIG. 1 a perspective view of two tundish parts defining a casting chamber for producing a sealing part to a filter element, FIG. 2 a section through a filter unit with a filter insert having a filter element and a sealing part molded onto the edge portion of the filter element FIG. 3 in one embodiment, two tundish parts for producing a sealing part to a filter element, FIG. 4 the filter element according to FIG. 3 in the installed state, FIG. 5 a sealing element presented alone, FIG. 6 a further sealing element.

FIG. 1 shows a casting apparatus 1 with a first tundish part 2 and a second tundish part 3, which serves to produce a filter insert part 4 comprising a filter element 5 and a sealing part 6. Using the casting apparatus 1 with the tundish parts 2, 3, the sealing part 6 can be produced and connected to the edge portion of the filter element 5 by casting or injection molding. Filter element 5 is, for example, an air filter element which consists for example of a folded filter paper and is in a rectangular shape, wherein the edge portion of the filter element 5 is provided with the surrounding sealing part 6 at two filter element sides.

The two tundish parts 2, 3 define a casting chamber 7, into which the sealing material is introduced in the non-cured state. This takes place advantageously in such a way that initially the two tundish parts 2, 3 are joined together, then the filter element 5 is placed in the intended position and, finally, the sealing material is introduced in the non-cured state into the casting chamber 7. But it is also possible to first introduce the sealing material into the casting chamber and subsequently place the filter element in its intended position in which the edge portion projects into the sealing material. After the curing of the sealing material, tundish parts 2, 3 can be removed, the sealing part 6 will retain its shape and is fixedly connected to the edge portion of the filter element 5.

A compensation space 8 is introduced in tundish part 2, which is connected to the casting chamber 7 and is formed as a closed space with a U-shaped cross section. Upon being introduced, the sealing material extends well into the compensation space 8. The amount of the introduced sealing material is in this case dimensioned such that even after the curing, the end face 9 of the sealing material projecting into the compensation space 8 is situated at a distance to the bottom or the top 10 of the U-shaped closed compensation space 8. This distance constitutes a compensation margin and makes it possible to compensate for variations in the dimensioning of the sealing material quantity or other process parameters that are determinative for the volume in the cured state.

The two side sealing surfaces 11 and 12 of the portion of the sealing part 6 projecting into the compensation space 8 are bounded by the opposing chamber walls of the compensation space 8. A sealing force may be exerted on the sealing surfaces 11 and 12 in the installed state of the filter insert part.

The compensation space 8 and the portion of the sealing part 6 projecting into the compensation space 8 are situated at a distance from the side surface facing the filter element 5. Between the exterior side of the first tundish part 2 and the side surface of the filter element 5, there extends a further portion of the sealing part 6, which surrounds the edge portion of the filter element 5.

Figure 2:
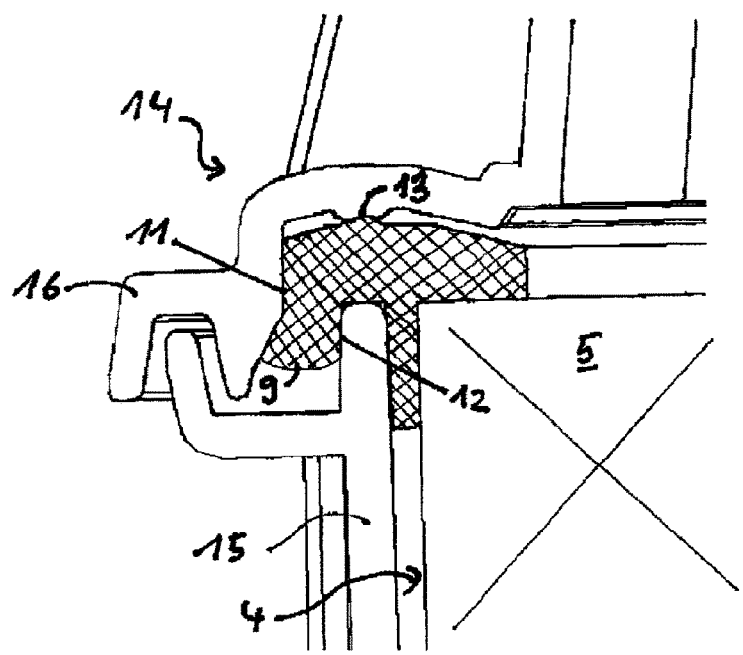

The second tundish 3 defines a further sealing surface 13 to a portion of the sealing part 6. This further sealing surface 13 is situated at a distance from the first two sealing surfaces 11 and 12 which are parallel to one another and correspond to the chamber walls of the compensation space 8. FIG. 2 shows a filter unit 14 having a filter insert part 4 which is produced according to the embodiment of FIG. 1. The filter unit 14 comprises a filter housing 15, in which the filter insert part 4 can be inserted, wherein the sealing part 6 at the edge portion rests against the end face of the filter housing 15 and is contacted by a cover 16 which is attachable to the filter housing 15 by means of a not shown connecting element such as a screw. The contact direction of the sealing force for sealing by means of the sealing surfaces 11 and 12 extends transversely to the flow-through direction of the filter element 5. Thus, it constitutes at least substantially a radial seal. An additional (smaller) component of the sealing force is initiated by the sealing surface 13 parallel to the flow-through direction of the filter element 5.

Figure 3:
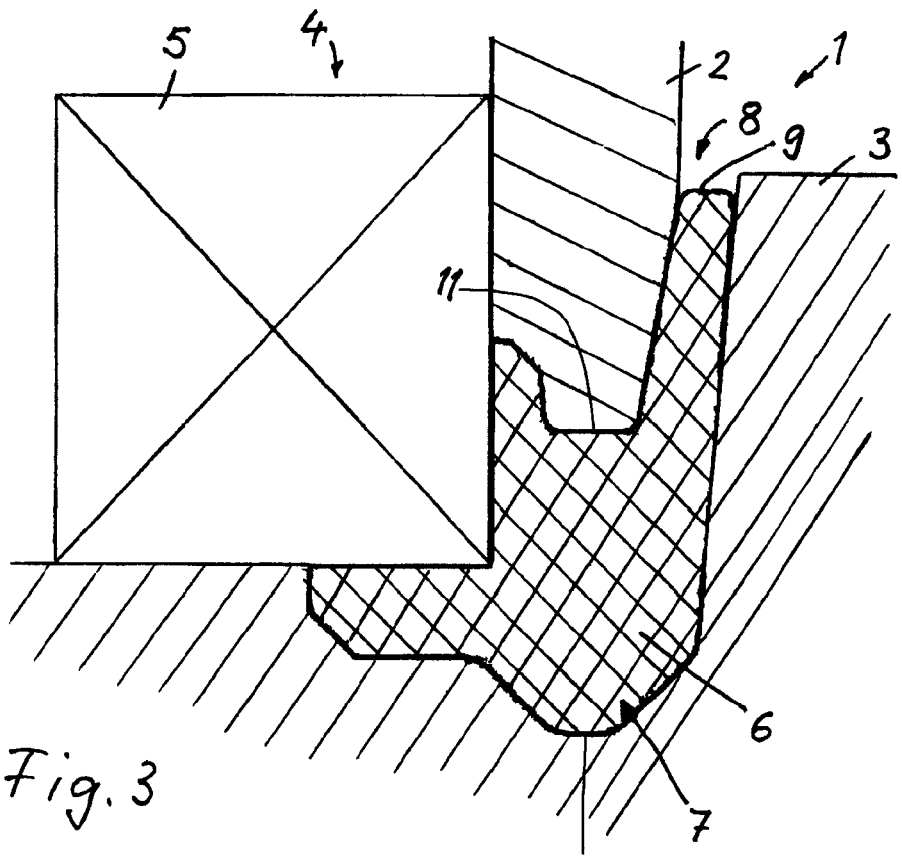
Figure 4:
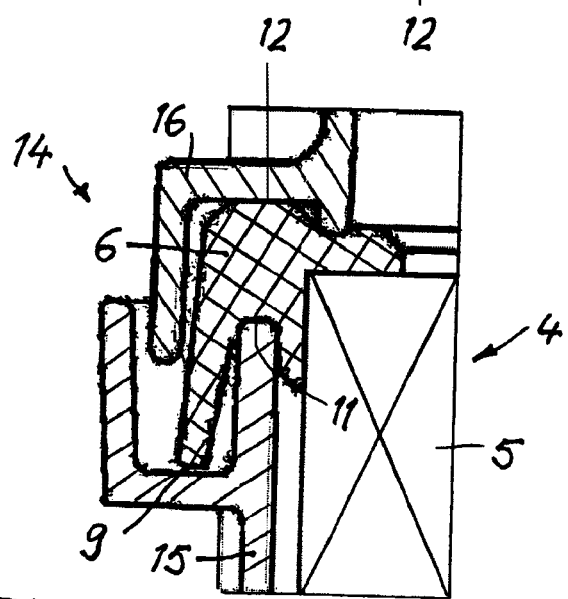

In FIGS. 3 and 4, a further embodiment is illustrated. FIG. 3 shows a casting apparatus 1 with two tundish parts 2 and 3, between which a casting chamber 7 is formed for producing a sealing part 6 to a filter element 5, wherein the filter element 5 and the sealing part 6 together form a filter insert part 4. The two tundish parts 2 and 3 of the casting apparatus 1 define a casting chamber 7 for receiving the sealing material 7, with an open compensation space 8 further provided between the two tundish parts 2 and 3, which is open to the exterior, i.e. to the surroundings. Upon introducing sealing material into the casting chamber 7, the sealing material expands into the compensation space 8, which is connected to the casting chamber 7. After curing, an end face 9 is formed at the open end side of the portion of the sealing part 6 projecting into the compensation space, but has no sealing function in the installed state of the filter insert part. The chamber walls of the casting chamber 7, which are respectively formed by side walls of the tundish parts 2 and 3, define the sealing surfaces 11 and 12 of the portion of the sealing part 6 formed in the casting chamber 7.

FIG. 4 depicts a filter unit 14 with the installed filter insert part 4. The sealing portion 6 is defined by the mutually facing end faces of the filter housing 15 and the cover 16 and receives a sealing force. The contact direction of the sealing force for sealing by means of the sealing surfaces 11 and 12 extends in parallel to the flow-through direction of the filter element 5. Thus, it constitutes at least substantially an axial seal. The free end face 9 projects into a receiving space, however it does not fulfill a sealing function.

Figure 5:
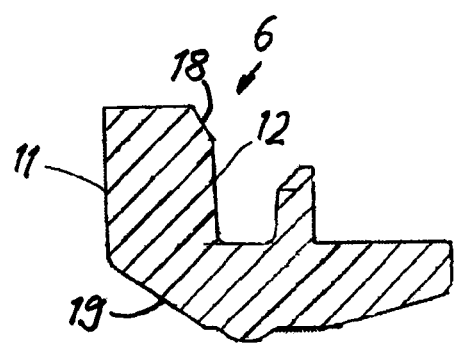
Figure 6:
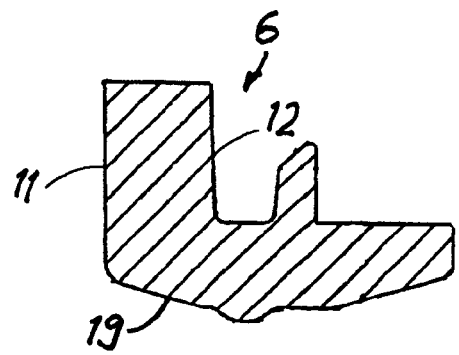

As can be seen in FIGS. 5 and 6, different faces of the sealing part 6 may be provided with a chamfer 18 and 19 respectively. In particular, this facilitates insertion into the filter housing. There may be one or more of such chamfers 18, 19 provided, the angle of which is adapted to the respective installation situation. The chamfers 18, 19 are either already produced during the casting process by providing corresponding chamfers in the tundish parts, or the chamfers on the sealing part 6 can also be produced subsequently by mechanical processing.

In the tree forms shown in FIGS. 5 and 6, the sealing surfaces 11 and 12 extend substantially parallel to the flow-through direction of the filter element 5. The contact direction of the sealing force thus extends transversely to the flow-through direction. These cases constitute radial seals.

What is claimed is:

1. A method for molding a sealing part directly onto a filter element using a mold casting apparatus, comprising the steps of:
    providing the filter element of a filter media having a flow face and an adjacent lateral side, the flow face is an inflow face or an outflow face;
    providing the mold casting apparatus including:
        a first tundish part of the mold casting apparatus, the first tundish part arranged at or proximate to the filter media on the lateral side of the filter element during molding and having a tip portion projecting towards the flow face of the filter element and spaced outwardly away from the lateral side of the filter element forming an open gap therebetween;
        a second tundish part of the mold casting apparatus, the second tundish part received directly against the filter media at the flow face of the filter element during molding, the second tundish part spaced away from the first tundish part and spaced away from the lateral side of the filter element, wherein the flow face and sidewall of the filter element together with the spaced apart first and second tundish parts form a casting chamber for receiving a sealing material;
    wherein the filter element is placed such that a filter element edge portion of the lateral side and flow face forms wall portions of the casting chamber, such that the first tundish part, the second tundish part with the filter element define the casting chamber;
    wherein the tip portion of the first tundish part in the casting chamber defines a groove in the sealing part having a bottom surface in the groove;
    wherein the second tundish part in the casting chamber has a recess for defining an opposing sealing surface of the sealing part arranged opposite the bottom surface of the groove;
    casting the sealing part by steps of:
        introducing sealing material in a non-cured state into the casting chamber; and
        curing of the sealing material in the casting chamber, the curing connecting the sealing part onto the edge portion of the filter element and also forming the groove in the sealing part having the bottom surface and the opposing sealing surface of the sealing part;
    wherein the casting chamber is arranged so that the groove in the sealing part having the bottom surface and the opposing sealing surface are formed on opposite chamber walls of the casting chamber.

2. The method according to claim 1, wherein a polyurethane foam is used as the sealing material.

3. The method according to claim 1, wherein the mold casting apparatus with the filter element therein provides a compensation space into which the sealing material expands during the casting of the sealing part, the compensation space in communication with the casting chamber;
    wherein a compensation end face is formed on an outermost end of the sealing material expanded into the compensation space, the compensation end face having a geometry which varies according to an amount of sealing material used and therefore the compensation end face is not a sealing surface;
    wherein the compensation end face of the sealing part differs from the sealing surface and the opposing sealing surface.

4. The method according to claim 1, wherein the filter element contacts both the first and the second tundish parts and the sealing material is directly cast, injected, or foamed to the edge portion of the filter element.

5. The method according to claim 1, wherein the compensation end face of the sealing part abuts at least one sealing surface on the sealing part.

6. The method according to claim 1, wherein the compensation space is arranged as a closed space within one of the tundish parts.

7. The method according to claim 1, wherein the compensation space is formed as an open space in communication with the casting chamber.

8. The method according to claim 7, wherein the open compensation space is arranged between the first and the second tundish parts.

9. The method according to claim 1, wherein a chamfer is formed onto at least one side of the sealing part.

10. The method according to claim 1, wherein
an axial direction, as defined herein, is a direction normal to a plane defined by the flow face;
wherein the tip of the first tundish part projects in an axial direction towards the recess of the second tundish part;
wherein the recess of the second tundish part is aligned axially with the projecting tip of the first tundish part.

11. The method according to claim 1, wherein
the first tundish part defines the bottom surface; and
the second tundish part defines the opposing sealing surface.

\* \* \* \* \*